United States Patent [19]

Grieves et al.

[11] Patent Number: 4,746,434

[45] Date of Patent: May 24, 1988

[54] PROCESS FOR TREATING SOUR WATER IN OIL REFINERIES

[75] Inventors: Colin G. Grieves, Batavia, Ill.; Robert J. Baechle, Savannah, Ga.; John M. Considine, Savannah, Ga.; Lawrence M. Bristow, Savannah, Ga.

[73] Assignee: Amoco Corporation, Chicago, Ill.

[21] Appl. No.: 65,857

[22] Filed: Jun. 24, 1987

[51] Int. Cl.⁴ .......................... C02F 1/26; C02F 3/02
[52] U.S. Cl. .................................. 210/610; 210/631; 210/638; 210/639; 210/909
[58] Field of Search ................................ 210/610-631, 210/633, 634, 638, 639, 648, 903, 909, 919

[56] References Cited

U.S. PATENT DOCUMENTS

| | | | |
|---|---|---|---|
| 2,899,385 | 8/1959 | Connell et al. | 210/909 X |
| 4,026,791 | 5/1977 | Wallace | 210/634 |
| 4,029,744 | 6/1977 | Li et al. | 210/638 X |
| 4,064,040 | 12/1977 | Singhal et al. | 210/638 |
| 4,132,636 | 1/1979 | Iwase et al. | 210/909 X |
| 4,160,725 | 7/1979 | Josis et al. | 210/638 |
| 4,179,365 | 12/1979 | Sumi | 210/909 X |
| 4,405,448 | 9/1983 | Googin et al. | 210/909 X |
| 4,495,056 | 1/1985 | Venardos et al. | 210/631 X |
| 4,518,502 | 5/1985 | Burns et al. | 210/909 X |
| 4,661,256 | 4/1987 | Johnson | 210/909 X |

Primary Examiner—Tom Wyse
Attorney, Agent, or Firm—Thomas W. Tolpin; William H. Magidson; Ralph C. Medhurst

[57] ABSTRACT

Sour process water from an oil refinery is partially treated by oil extraction. The partially treated water can be biologically treated, upgraded and further purified in a cooling tower, trickle filter, and/or activated sludge tank.

20 Claims, 1 Drawing Sheet

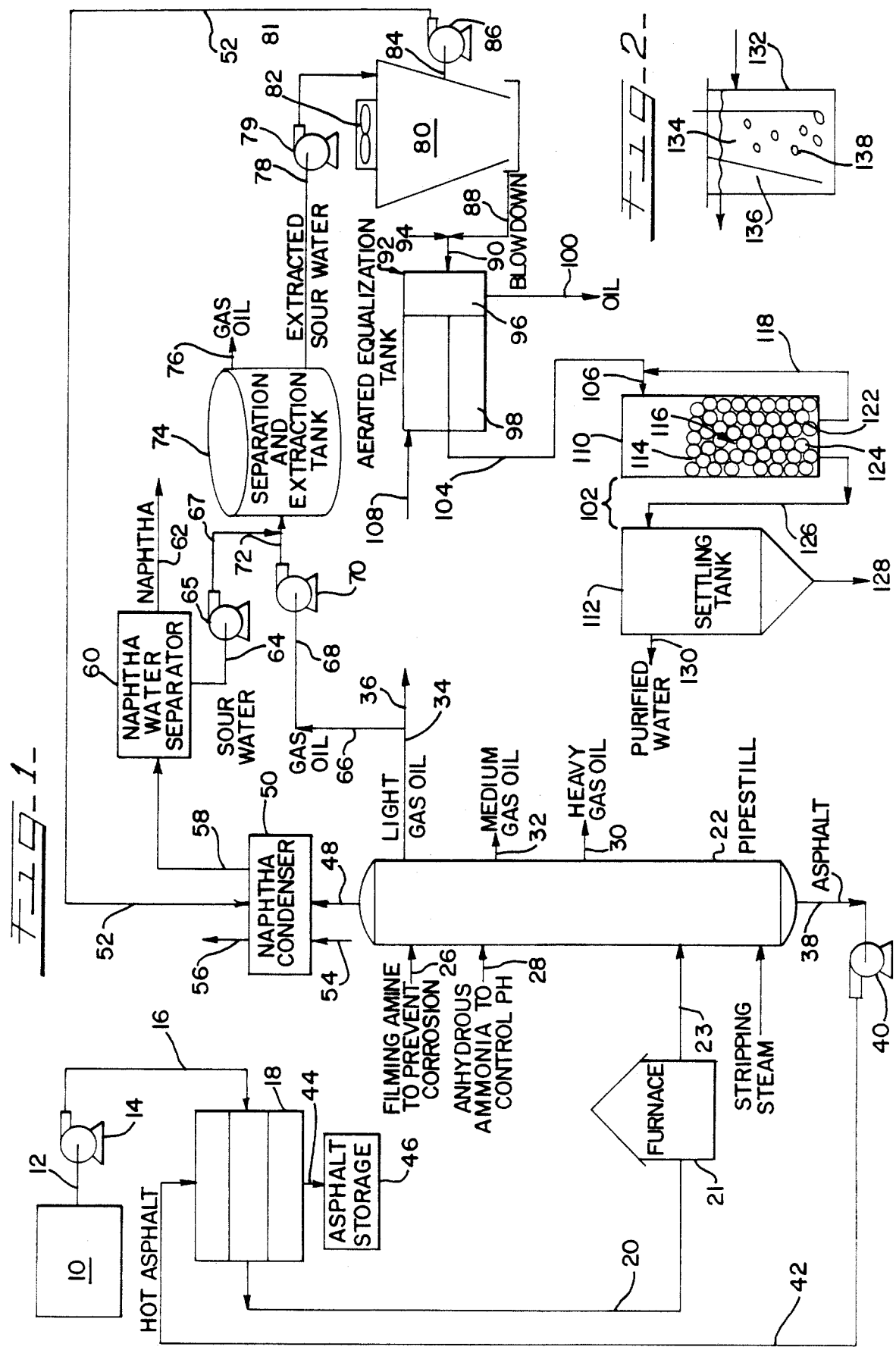

PROCESS FOR TREATING SOUR WATER IN OIL REFINERIES

BACKGROUND OF THE INVENTION

This invention relates to oil refineries and, more particularly, to a process for refining crude oil and purifying effluent refinery water.

Purified water and processed steam (vaporized water) are used in many oil refinery operations. Such refinery operations include steam injection in pipestills, cokers, fluid catalytic cracking units, mid-distillate strippers, and light distillate strippers and the use of water in heat exchangers and various water-wash operations.

Significant quantities of contaminated, sour refinery water are produced during such oil refinery operations. Sour refinery water is laden with suspended and dissolved impurities, such as phenols, sulfides, ammonia, and other hydrocarbons, such as oil and grease. Oil refinery water usually contains different pollutants than sewage, causing difficult disposal and purification problems.

Sour refinery water needs to be treated for safe effective use in refinery operations as well as for safe discharge into the ocean, lakes, rivers, streams, collection basins and other bodies of water. Sour refinery water also needs to be treated to comply with the standards set by the Federal Environmental Protection Agency and State Regulatory Agencies. Untreated sour refinery water is usually not safe for drinking or bathing. It can be toxic to aquatic life. It also contains sulfides and other contaminants which can corrode and plug refinery equipment.

The quantity of pollutants in oil refinery water is often determined by measuring the amount of dissolved oxygen required to biologically decompose the waste organic matter in the polluted water. This measurement, called biochemical oxygen demand (BOD), provides an index of the organic pollution in the water. Many organic contaminants in oil refinery water are not amenable to conventional biological decomposition. Therefore, tests such as chemical oxygen demand (COD) and total organic carbon (TOC) are used to more accurately measure the quantity of pollutants in oil refinery water. Chemical oxygen demand measures the amount of oxygen needed to chemically oxidize the organic matter in waste water. Total organic carbon measures the amount of organic carbon in waste water.

Over the years, a variety of methods have been developed for purifying or otherwise processing sour refinery water, oil shale retort water, waste water petrochemical streams, and sewage. Typifying the many prior art methods for purifying and/or processing sour refinery water, oil shale retort water, waste water petrochemical streams, and sewage are those described in U.S. Pat. Nos. 1,955,065, 2,073,248, 2,789,083, 2,808,375, 2,812,305, 2,948,677, 2,999,808, 3,123,556, 3,211,643, 3,335,865, 3,589,997, 3,663,435, 3,815,750, 3,836,456, 3,846,293, 3,903,250, 3,904,518, 4,026,791, 4,043,881, 4,049,782, 4,066,538, 4,069,148, 4,073,722, 4,105,546, 4,121,662, 4,124,501, 4,141,824, 4,162,902, 4,178,039, 4,178,824, 4,179,365, 4,207,179, 4,231,617, 4,233,152, 4,289,578, 4,379,591, 4,387,025, 4,401,570, 4,415,442, 4,422,940, 4,499,058, 4,505,813, 4,518,502. These prior art methods have met with varying degrees of success.

It is, therefore, desirable to provide an improved process for treating oil refinery water.

SUMMARY OF THE INVENTION

An improved process is provided for efficiently, economically, and effectively treating sour process water in oil refineries. Advantageously, the novel process complies with standards set by the Federal Environmental Protection Agency (EPA) and state regulatory agencies. Purified water treated by the novel process can be pipelined or recycled to heat exchangers and other oil refinery equipment. Desirably, refinery water treated by the novel process can be safely discharged into the ocean, lakes, rivers, streams, collection basins and other bodies of water without adversely affecting aquatic life.

In the novel oil refinery process, sour waste water is discharged from oil refinery equipment, such as pipestills, cokers, stripper sections in fluid catalytic cracking units, middle distillate strippers, light distillate strippers, heat exchangers, and various water-wash equipment. In order to purify the sour waste water, oil, such as gas oil, naphtha, or crude oil, is mixed with the sour refinery water. Phenols and other contaminants are extracted from the sour refinery water with the oil.

The sour refinery water can be biologically treated and upgraded after oil extraction. Such biological treatment can include passing the refinery water through a cooling tower, a trickling filter, or a tank of activated sludge followed by a settler or clarifier.

As used in this patent application, the terms "refinery water," "sour water," and "waste water" mean water and/or water vapor (steam) which have been emitted or discharged during processing of oil in oil refineries.

The abbreviation "TOC" as used herein means total organic carbon.

The abbreviation "DOC" as used herein means dissolved organic carbon.

The abbreviation "COD" as used herein means chemical oxygen demand.

The abbreviation "ppm" as used herein means parts per million.

A more detailed explanation of the invention is provided in the following description and appended claims taken in conjunction with the accompanying drawings.

BRIEF DESCRIPTION OF THE DRAWINGS

FIG. 1 is a schematic flow diagram of a process for refining crude oil and treating sour refinery water in accordance with principles of the present invention; and FIG. 2 is a schematic diagram of an activated sludge tank for use in the water treatment process.

DETAILED DESCRIPTION OF THE PREFERRED EMBODIMENTS

In an oil refinery, crude oil (petroleum), which often contains from 0.6% to 1.8%, by weight water, is stored in an aboveground heated storage tank 10 (FIG. 1) where it is heated to about 160° F. to about 180° F. to maintain the proper viscosity and flow characteristics. The crude oil is withdrawn from the aboveground heated storage tank 10 through a tank outlet line 12 by a pump 14 and pumped through a preheat line 16 to a heat exchanger 18. In the heat exchanger 18, the crude oil is heated to about 500° F. The crude oil can be heated in the heat exchanger 18 by parallel or transverse indirect heat exchange with hot asphalt. Water in the crude oil is vaporized into steam in the heat exchanger 18.

The heated crude oil exits the heat exchanger 18 through a pipestill feed line 20 where it is further heated in a furnace 21 to about 700° F. The heated crude oil exits the furnace 21 and is fed through a furnace outlet line 23 to a pipestill or primary tower 22. The crude oil enters the flash zone of the tower 22 before proceeding to the upper rectifier section or the lower stripper section of the tower 22. The pipestill 22 (tower) is preferably operated at a pressure less than about 9 psig.

Steam is injected into the pipestill 22 (tower) through a steam line 24 to increase the partial vapor pressure and strip off the light ends of the crude. The steam also enhances vaporization of the crude and minimizes thermal cracking of more valuable liquid hydrocarbons. A filming amine is fed into the pipestill 22 through a filming amine line 26 to help prevent corrosion. Anhydrous ammonia is injected into the pipestill 22 through an ammonia line 28 to control the pH of the effluent sour refinery water vapor.

In the pipestill 22 (tower), the crude oil is separated into fractions, such as: about 74% by weight asphalt, about 2% by weight heavy gas oil, about 11% by weight medium gas oil, about 10% by weight light gas oil, and about 3% by weight naphtha. In the pipestill 22 (tower) the stripping steam and water in the crude oil are discharged as sour refinery water vapors along with the naphtha. The amount of sour refinery water vapors ranges from about 4% to about 6% of the crude oil.

Heavy gas oil is withdrawn from the pipestill 22 (tower) through a heavy gas oil line 30. Medium gas oil is removed from the pipestill 22 through a medium gas oil line 32. Light gas oil is removed from the pipestill 22 through light gas oil lines 34 and 36.

Hot asphalt at about 600° F. to about 650° F. is discharged from the bottom of the pipestill 22 (tower) through an asphalt line 38. The asphalt is pumped by a pump 40 through a hot asphalt line 42 into the heat exchanger 18. In the heat exchanger, the hot asphalt is cooled to a temperature of from about 325° F. to about 350° F. while the crude oil feedstock is heated to about 500° F. The cooled asphalt is discharged from the heat exchanger 18 through a cooled asphalt line 44 and conveyed to an aboveground asphalt storage tank 46.

The naphtha and sour refinery water vapors are withdrawn from the top portion of the pipestill 22 (tower) through an overhead line 48 and fed to a naphtha condenser 50. Cooling tower effluent water in cooling tower effluent water line 52 or air in pneumatic line 54 is fed into the condenser 50 to cool and condense the naphtha and sour refinery water vapor. Noncondensable gases, such as nitrogen, hydrogen sulfide, methane, and ethane are withdrawn from the condenser 50 through a vent line 56. Liquid naphtha and sour refinery waste water are discharged from the condenser 50 through liquid naphtha and water line 58 and fed to a naphtha-water separator 60.

In the naphtha-water separator 60, the mixture of naphtha and sour refinery waste water is separated by gravity into a stream of naphtha and a stream of sour refinery waste water. Naphtha is removed from the naphtha separator 60 through a naphtha line 62. Sour oil refinery waste water is discharged from the bottom portion of the naphtha separator 60 through a sour water line 64.

The effluent sour refinery waste water (process water) in the sour water line 64 contains a substantial amount of contaminants and impurities including phenols, sulfides, and hydrocarbons comprising oil and grease and chemical oxygen demand (COD). The phenols in the sour water can range from about 6 to about 50 mg/l. The sulfides in the sour water can range from about 0.1 to about 78 mg/l. The ammonia in the sour water can range from about 27 to about 230 mg/l. The COD of the sour water can range from about 500 to about 4100 mg/l. The other hydrocarbons, such as oil and grease, in the sour water can range from about 50 to about 500 mg/l. The pH in the sour water can range from about 5 to about 7.

All of the light gas oil that is removed from the pipestill 22 (tower) is fed and optionally pumped through a light gas oil pump 70 to a gas oil pump outlet line 72, also referred to as a separation and extraction tank-feed line. In order to treat the sour refinery water, the sour refinery water is pumped by a water pump 65 through a water pump outlet line 67 into the gas oil in the gas oil pump outlet line 72. The ratio of light gas oil to sour water can range from about 1:50 to about 50:1 and preferably about 2:1. The water is dispersed, contacted, and mixed with the gas oil. The mixture of gas oil and sour refinery water is fed to a separation and extraction tank 74.

In the feed line 72 and the separation and extraction tank 74, phenols and sulfides are extracted from the sour refinery water by the light gas oil. During the extraction in the tank 74, the mixture of light gas oil and sour refinery water is separated into two phases: (1) an upper phenol-enriched phase (stream) of light gas oil containing a substantially greater concentration of phenols and sulfides than the influent mixture of light gas oil and sour refinery water into the separation and extraction tank 74, and (2) a sulfide lean phase (stream) of water containing a subsantially lower concentrate of phenols and sulfides than the influent mixture of light gas oil and sour refinery water into the separation and extraction tank 74. The residence time in the separation and extraction tank 74 can range from about 5 minutes to about 2 hours and preferably from about 10 minutes to about 15 minutes for best results.

During extraction, the amount of phenols in the sour refinery water is decreased by about 35% to about 90% and preferably at least about 70% by weight in the separation and extraction tank 74. The sulfide concentration in the sour refinery water can be decreased by about 10% to about 100% by weight in the separation and extraction tank 74. The concentration of ammonia in the sour refinery water is decreased by about 0.1% to about 15% and preferably at least about 10% by weight in the separation and extraction tank 74. The chemical oxygen demand of the sour refinery water is decreased by about 15% to about 40% and preferably at least about 25% by weight in the separation and extraction tank.

The phenol-enriched stream of gas oil is withdrawn from the separation and extraction tank 74 through a phenol-enriched oil line 76. The phenol-enriched oil can be transported to a fluid catalytic cracking unit for upgrading and production of more valuable liquid hydrocarbons, such as gasoline. Phenol-enriched oil produced by the water treatment process of this invention can be useful since it contains additional hydrocarbons which increase product yield, octane, and refinery output.

The extracted phenol lean stream of sour refinery water is withdrawn from the bottom portion of the separation and extraction tank 74 through an extracted sour water line 78 and conveyed by a pump 79 through a pump outlet line 81 to a cooling tower 80. The cooling tower 80 removes substantial additional amounts of phenols, ammonia, sulfides, soluble hydrocarbons and chemical oxygen demand (COD) from the influent, phenol lean stream of sour refinery water. In the cooling tower 80, the phenol lean stream of water is cooled, aerobically, biologically treated, and air stripped. The sour refinery water is cooled in both the extracted water line 78 and the cooling tower 80. The phenol lean stream of water is air cooled from a temperature ranging from about 96° F. to about 106° F. to about 80° F. to about 86° F., such as by a fan 82 in the top portion of the cooling tower 80. The fan 82 draws the air upwardly in countercurrent flow relationship to the downward flow of refinery water to cool the refinery water. The countercurrent flow of air in the cooling tower also air strips and removes contaminants and impurities from the water. Microorganisms on the interior surfaces of the cooling tower 80 provide aerobic biological treatment of the refinery water.

In the cooling tower 80, the concentration of phenols in the extracted sour water entering the cooling tower is decreased by about 5% to about 98% and preferably by at least about 68% by weight. The concentration of sulfides in the extracted sour water in the cooling tower is decreased by about 90% to about 100% and preferably by at least about 99% by weight. The concentration of ammonia in the extracted sour water in the cooling tower is decreased by about 5% to about 99% and preferably by at least about 62% by weight. The concentration of other hydrocarbons, such as oil and grease, in the extracted sour water in the cooling tower is decreased by about 5% to about 70% by weight. The COD in the refinery water in the cooling tower is decreased by about 5% to about 70% and preferably at least about 32% by weight. The pH level in the water in the cooling tower is controlled and regulated from about 6.5 to about 7.4.

A substantial portion of the cooled effluent water is withdrawn from the cooling tower 80 through a water outlet line 84 and pumped by a pump 86, through a recycle water line or cooling tower effluent water line 52 into the naphtha condenser 58 to cool, condense, and liquify the influent vaporous mixture of naphtha and sour refinery water from the pipestill 22 (tower).

A portion of the partially treated, cooled water is discharged from the cooling tower 80 through a cool water line or blowdown line 88, such as at 7 gpm, and fed through an aerated equalization tank inlet line 90 to an optional aerated equalization tank or surge tank 92. In the aerated equalization tank (vessel) 92, the influent, cooled refinery water can pass through an oil and water separation compartment 96 and an aeration compartment 98. The oil and water separation compartment 96 removes any remaining trace amounts of oil from the refinery water. The separated oil is discharged from the oil and water separation compartment 96 through a separated oil discharge line 100. The refinery water is aerated in the aeration compartment 98.

The aerated equalization tank (vessel) 92 balances and controls the pH level of the refinery water to about 6 to 9 and preferably to about 7 to 8.5. The aerated equalization tank 92 also helps equalize the flow and control surges of water into the optional biological treatment unit (system) 102. The aerated water is discharged from the aeration compartment 98 of the aerated equalization tank 92 and fed to the biological treatment unit 102 through an aerated water line 104 and a combined, common, aerated water, recycle line 106.

Phosphorus compound nutrients, such as phosphoric acid, are fed into the aerated equalization tank 92 through a nutrient line 108. The phosphorus compound nutrients facilitate microorganism growth in the biological treatment unit 102. For best results the ratio of biochemical oxygen demand (BOD) to nitrogen to phosphorus should be about 100:5:1.

In the embodiment of FIG. 1, the biological treatment unit 102 comprises a trickling or trickle filter 110 and an optional settling tank or settler 112 or mixed media filter. The trickling (trickle) filter 110 has random trickling filter packing 114, such as gravel or commercially-available plastic media, within its interior. Microorganisms 116 grow on the surfaces of the trickling filter packing. The influent, aerated cooled, refinery water trickles downwardly through the spaces and voids between the filter packing 114. The microorganisms oxidize most of the remaining contaminants in the water.

Preferably, some of the oxidized water is withdrawn from the bottom of the trickling filter 110 through a recycle line 118. Recycle water is injected and mixed with the aerated water from the aerated equalization tank 92 in the combined, common, aerated water, recycle line 106 and recycled into the upper portion of the trickling filter 112. The recycle ratio of recycle water to aerated cooled water from the aerated equalization tank can range from about 0.5:1 to about 5:1. The recycled water controls the concentration and dilutes the aerated refinery water from the aerated equalization tank 92 to maintain and enhance growth of the microorganisms 116 on the surfaces of the trickling filter packing 114. The recycled water also maintains wetability of the microorganisms 116 in the event of temporary flow stoppages of the aerated water from the aerated equalization tank 92.

The microorganisms 116 in the trickling (trickle) filter 110 include carbonaceous oxidation microorganisms 122 and nitrifying microorganisms 124. The carbonaceous oxidation microorganisms 122 metabolize, oxidize and convert organic carbon in the refinery water to carbon dioxide and water. The organic carbon includes phenols, and other hydrocarbons, comprising oil and grease, COD, BOD, and TOC. The nitrifying microorganisms 124 metabolize, oxidize, and convert ammonia in the refinery water to nitrate.

In the trickling (trickle) filter 110, the concentration of phenols in the refinery water is decreased by about 30% to about 100% and preferably by at least about 68% by weight. The concentration of sulfides in the refinery water can be decreased in the trickling filter by about 0.1% to about 100% and preferably at least about 98% by weight. The concentration of ammonia in the refinery water is decreased in the trickling filter 110 by about 0.1% to about 90% and preferably by about 20% to at least about 50% by weight. The concentration of COD in the refinery water is decreased in the trickling filter 110 by about 4% to about 48% and preferably by 25% to at least about 45% by weight.

Filtered, oxidized refinery water is discharged from the bottom portion of the trickling filter 110 through a filter discharge line 126 and optionally fed to the top portion of the settling tank 112. In the settling tank 112, microorganisms contained in the water fall by gravity flow and collect as sludge in the bottom portion of the settling tank 112.

The sludge is withdrawn from the bottom of the settling tank 112 through a sludge line 128. The purified refinery water is withdrawn from the top portion of the settling tank 112 through a purified water line 130.

The purified refinery water is substantially free of dangerous levels of contaminants, pollutants, and impurities, and can be safely discharged into the ocean, lakes, rivers, streams, collection basins, and other bodies of water without injuring fish, plants, and other aquatic life. The purified water exceeds the standards for discharge set by the Federal Environmental Protection Agency. The purified refinery water is substantially free of contaminants which might otherwise corrode or foul up (plug) equipment in the oil refinery. The purified water can be upgraded, recycled, conveyed, and used in different equipment and operations in the oil refinery, such as in heat exchangers and water-washing operations. Purified refinery water can also be upgraded and vaporized into steam and injected and used in various oil refinery equipment, such as pipestills, stripper sections in fluid catalytic cracking units, middle distillate strippers, light distillate strippers, and cokers (coke drums).

Advantageously, the concentration of phenols in the purified refinery water is from about 0.1 to about 1 ppm. The concentration of sulfides in the purified refinery water is less than 0.1 ppm. The concentration of ammonia in the purified refinery water can be from about 4 ppm to about 50 ppm and preferably is less than 10 ppm. The concentration of oil and grease in the purified refinery water is less than 10 ppm. The concentration of COD in the purified refinery water can range from about 10 ppm to about 300 ppm and is preferably less than about 100 ppm.

In the embodiment of FIG. 2, the biological treatment unit comprises a tank 132 of activated sludge. The activated sludge tank 132 contains an aeration chamber 134 and a clarifier chamber 136. The activated sludge tank 132 (FIG. 2) and the trickling filter 110 (FIG. 1) each provide biological treatment vessels.

In the aeration chamber 136 of the activated sludge tank 132, air bubbles are rapidly circulated through the influent refinery water. Microorganisms 138 in the aeration chamber 134 of the activated sludge tank 132 degrade, consume, and digest the biodegradable contaminants in the influent refinery water. The microorganisms 138 in the aeration chamber 134 of the activated sludge tank 132 are similar to the microorganisms 116 in the trickling filter 110 of FIG. 1 and accomplish similar results but in a more efficient manner.

In the clarifier chamber 136 of the activated sludge tank 132, the effluent refinery water from the aeration chamber 134 of the activated sludge tank 132 flows over one or more weirs and is separated from the microorganisms 138. The microorganisms 138 are subsequently recycled back to the aeration chamber 134 of the activated sludge tank 132 for further use.

The activated sludge tank 132 operates at atmospheric pressure with a solids (sludge) residence time of from about 1 day to about 100 days and preferably from about 25 days to 30 days. The hydraulic residence time of the influent refinery water passing through the activated sludge tank 132 can be from about 4 hours to about 36 hours and preferably about 14 hours to about 18 hours for most efficient biological treatment.

In some circumstances, it may also be desirable to use an API (American Petroleum Institute) oil-water separator.

Extensive tests were conducted at the Amoco Oil Company Refinery in Savannah, Ga. The tests produced unexpected and surprisingly good results.

EXAMPLE 1

Tests were conducted at the oil refinery of Amoco Oil Company at Savannah, Ga. using a process similar to that shown in FIG. 1. About 45 gpm of sour refinery water were removed, treated, and purified at a daily flow rate of about 64,800 gpd. The average concentration of contaminants and impurities in the sour refinery water were: 30 mg/l phenols, 60 mg/l ammonia, 15 mg/l sulfides, and 850 mg/l COD. The sour refinery water was passed through a cooling tower at about 9 gpm at a daily flow rate of about 12,960 gpd. The concentrations of contaminants and impurities of the effluent refinery water exiting the cooling tower effluent were: 4 mg/l phenols, 50.5 mg/l ammonia, less than 0.1 mg/l sulfides, and 600 mg/l COD. Purified refinery water was discharged from a biological treatment unit comprising a trickling (trickle) filter at about 4 gpm at a daily flow rate of about 5760 gpd. The purified refinery water contained acceptable low levels of impurities: 1 mg/l phenols, 40 mg/l ammonia, less than 0.1 mg/l sulfides, and 300 mg/l COD.

EXAMPLE 2

The trickling filter of Example 1 was observed and tested over a 157 day study. The results are shown in Table A.

TABLE A

| Phenols Reduction by Trickling Filter (TF) | | | | |
| --- | --- | --- | --- | --- |
| Days | Sour Water Flow (GPM) | TF Feed Flow (GPM) | TF Feed Phenols (mg/l) | TF Recycle Flow (GPM) |
| 0–20 | Start-up phase. | | | |
| 10–33 | 1.0 | 5.0 | 19.0 | 4.0 |
| 34–72 | 0.25 | 2.50 | 2.1 | 2.25 |
| 73–81 | 0.50 | 2.50 | 1.0 | 2.0 |
| 82–93 | 1.0 | 3.0 | 5.5 | 2.0 |
| 94–129 | 1.5 | 3.5 | 14.6 | 2.0 |
| 130–157 | 0.5 | 2.5 | 10.3 | 2.0 |

| Days | TF Effluent Phenols (mg/l) | Phenols Removal Efficiency (%) | Lbs. Phenols Removed per day per 130 ft³ Media |
| --- | --- | --- | --- |
| 0–20 | Start-up phase. | | |
| 10–33 | 15 | 21 | 0.24 |
| 34–72 | 0.65 | 69 | 0.04 |
| 73–81 | 0 | 100 | 0.03 |
| 82–93 | 4.2 | 24 | 0.05 |
| 94–129 | 9.0 | 38 | 0.23 |
| 130–157 | 6.2 | 40 | 0.12 |

Among the many advantages of the oil refinery and water treatment process of this invention are:
1. Superior purification of sour refinery water.
2. Greater product yield.
3. Less corrosion of refinery equipment.
4. Decreased plugging and fouling of refinery equipment.
5. Safer discharge of treated refinery water into oceans, lakes, rivers, and other bodies of water.
6. Ability to upgrade and use the treated refinery water in other refinery equipment and operations.
7. Exceeds standards set by the Federal Environmental Protection Agency and the Georgia Environmental Protection Department.
8. Economical.

9. Effective.

Although embodiments of the invention have been shown and described, it is to be understood that various modifications and substitutions, as well as rearrangements and combinations of process steps and equipment, can be made by those skilled in the art without departing from the novel spirit and scope of this invention.

What is claimed is:

1. An oil refinery process, comprising the steps of:
   discharging waste water from refinery equipment; contacting said waste water with oil; and extracting phenols from said waste water with said oil.

2. An oil refinery process in accordance with claim 1 including mixing said oil and water.

3. An oil refinery process in accordance with claim 1 including biologically treating said waste water.

4. An oil refinery process in accordance with claim 3 including settling said biologically treated waste water.

5. An oil refinery process in accordance with claim 3 wherein said biological treating includes passing said waste water through a trickle filter.

6. An oil refinery process in accordance with claim 3 wherein said biological treating comprises passing said waste water through a tank of activated sludge.

7. An oil refinery process in accordance with claim 3 wherein said biological treating includes cooling said waste water in a cooling tower.

8. An oil refinery process in accordance with claim 1 wherein said oil is selected from the group consisting of naphtha and gas oil.

9. An oil refinery process, comprising the steps of:
   contacting sour refinery water containing a substantial amount of contaminants comprising phenols, ammonia, sulfides, soluble hydrocarbons, and chemical oxygen demand with a solvent comprising an oil selected from the group consisting of crude oil, naphtha, heavy gas oil, medium gas oil, and light gas oil;
   dispersing and mixing said water with said oil;
   feeding said mixture through a feed line to a separation and extraction vessel;
   extracting a substantial amount of phenols from said water with said oil in said feed line and said separation and extraction vessel;
   separating said mixture of oil and sour refinery water in said separation and extraction vessel into a phenol lean stream of water containing a substantially lesser concentration of phenols and phenol-enriched stream of oil; and
   removing a substantial amount of phenols, ammonia, sulfides, soluble hydrocarbons and chemical oxygen demand from said phenol lean stream of water in a cooling tower by
      cooling said phenol lean stream of water in said cooling tower;
      aerobically, biologically treating said phenol lean stream of water in said cooling tower; and
      air stripping said phenol lean stream of water in said cooling tower.

10. An oil refinery process in accordance with claim 9 including:
    passing said cooled stream of water to a biologic treatment vessel selected from the group consisting of a trickling filter and a tank of activated sludge;
    biologically removing a substantial amount of remaining contaminants from said cooled water in said biological treatment vessel, including metabolizing organic carbon comprising soluble hydrocarbons, phenols, oil, and grease in said biological treatment vessel to carbon dioxide and substantially purified water; and
    converting and oxidizing ammonia in said cooled water with nitrifying organisms in said biological treatment vessel to nitrates.

11. An oil refinery process in accordance with claim 9 including controlling the flow rate and pH level of said cooled water in a pH control tank selected from the group consisting of an aerated equalization tank and a surge tank.

12. An oil refinery process in accordance with claim 11 including injecting a phosphorus compound nutrient into said pH control tank to facilitate growth of microorganisms in said biological treatment vessel.

13. An oil refinery process in accordance with claim 12 including clarifying said water downstream of said biological treatment vessel.

14. An oil refinery process in accordance with claim 12 including removing microorganisms from said purified water in a settling tank downstream of said biological treatment vessel.

15. An oil refinery process in accordance with claim 12 including recycling some of said purified water to said biological treatment vessel.

16. An oil refinery process, comprising the steps of:
    pumping crude oil comprising oil and water through a heat exchanger;
    heating said crude oil in a heat exchanger and a furnace;
    conveying said heated oil to a primary tower comprising a pipestill;
    injecting steam in said tower;
    separating the heated oil in said tower into fractions of asphalt, heavy gas oil, medium gas oil, light gas oil, and a vaporous mixture of naphtha and sour refinery water;
    cycling the asphalt to said heat exchanger;
    simultaneously heating said crude oil in said heat exchanger with said asphalt and cooling said asphalt;
    conveying said cooled asphalt to a storage tank;
    withdrawing said vaporous mixture of naphtha and sour refinery water from said tower;
    condensing and liquifying said vaporous mixture of naphtha and sour refinery water in a condenser;
    separating said liquified naphtha and said sour refinery water by gravity in a separator, said sour refinery water containing a substantial amount of contaminants comprising phenols, ammonia, sulfides, soluble hydrocarbons, and chemical oxygen demand;
    injecting, dispersing, and mixing said sour refinery water with said light gas oil from said tower;
    feeding said mixture of light gas oil and sour refinery water through a feed line to a separation and extraction vessel;
    extracting a substantial amount of phenol from said sour refinery water with said light gas oil in said feed line and said separation and extraction vessel;
    separating said mixture of oil and sour refinery water in said separation and extraction vessel into a phenol lean stream of water containing a substantially lower concentration of phenols than said influent sour refinery water and a phenol-enriched stream of light gas oil;

withdrawing said phenol-enriched stream of light gas oil from said separation and extraction tank;

discharging and conveying said phenol lean stream of water from said separation and extraction tank to a cooling tower;

removing a substantial amount of phenols, ammonia, sulfides, soluble hydrocarbons, and chemical oxygen demand from said phenol lean stream of water in said cooling tower by
  cooling said phenol lean stream of water in said cooling tower,
  aerobically, biologically treating said phenol lean stream of water in said cooling tower, and
  air stripping said phenol lean stream of water in said cooling tower.

17. An oil refinery process in accordance with claim 16 including recycling a substantial portion of cooling tower effluent water from said cooling tower to said condenser to condense said vaporous mixture of naphtha and sour refinery water.

18. A process in accordance with claim 16 including:

passing said cooled stream of water to a biological treatment vessel selected from the group consisting of a trickle filter and an activated sludge tank; and biologically removing a substantial amount of contaminants from said cooled water in said biological treatment vessel including converting and oxidizing ammonia in said cooled water with nitrifying microorganisms and metabolizing organic carbon comprising soluble hydrocarbons, phenols, oil and grease with carbonaceous oxidation microorganisms.

19. A process in accordance with claim 18 including removing said microorganisms from said biologically treated water in a microbiological treatment zone selected from the group consisting of a clarifier chamber and a settling tank and recycling some of said purified water to said biological treatment vessel.

20. The process in accordance with claim 18 including:
  controlling the flow rate and pH level of said cooled water in an aerated equalization tank; and
  injecting a phosphorus compound nutrient into said aerated equalization tank to facilitate growth of said microorganisms in said biological treatment vessel.

* * * * *

UNITED STATES PATENT OFFICE
CERTIFICATE OF CORRECTION

Patent No. 4,746,434      Dated May 24, 1988

Inventor(s) COLLIN G. GRIEVES, ROBERT J. BAECHLE, JOHN M. CONSIDINE, and LAWRENCE M. BRISTOW It is certified that error appears in the above-identified patent and that said Letters Patent is hereby corrected as shown below:

| Column | Line | |
|---|---|---|
| 9 | 63 | "biologic" should read --biological-- |

Signed and Sealed this

Tenth Day of July, 1990

*Attest:*

HARRY F. MANBECK, JR.

*Attesting Officer*     *Commissioner of Patents and Trademarks*